(12) United States Patent
Bathel et al.

(10) Patent No.: US 11,796,306 B2
(45) Date of Patent: Oct. 24, 2023

(54) METHODS AND APPARATUS FOR AN ADJUSTABLE BEAM DIRECTING OPTICAL SYSTEM

(71) Applicant: UNITED STATES OF AMERICA AS REPRESENTED BY THE ADMINISTRATOR OF NASA, Washington, DC (US)

(72) Inventors: Brett F. Bathel, Yorktown, VA (US); Joshua M. Weisberger, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 343 days.

(21) Appl. No.: 17/032,341

(22) Filed: Sep. 25, 2020

(65) Prior Publication Data

US 2022/0099429 A1 Mar. 31, 2022

(51) Int. Cl.
*G01B 9/02* (2022.01)
*G01B 9/02015* (2022.01)
(Continued)

(52) U.S. Cl.
CPC ..... *G01B 9/02015* (2013.01); *G01B 9/02001* (2013.01); *G02B 5/3083* (2013.01);
(Continued)

(58) Field of Classification Search
CPC .. G01J 3/0224; G01J 2003/1291; G01J 3/447; G01B 9/02015; G01B 9/02001;
(Continued)

(56) References Cited

U.S. PATENT DOCUMENTS 2,975,668 A * 3/1961 Eckel ................. G02B 26/0883
359/837
4,265,534 A * 5/1981 Remijan ................. G01B 9/02
356/521
(Continued)

OTHER PUBLICATIONS

Bathel et al., "Two-point, parallel-beam focused laser differential interferometry with a Nomarski prism," Applied Optics, 2020, pp. 24-252. vol. 59, No. 2.
Smeets, "Report 28/73 Laser-Differential Interferometer Applications in Gas Dynamics," 1973. pp. 1-67, France.
(Continued)

*Primary Examiner* — Ricky D Shafer
(74) *Attorney, Agent, or Firm* — Shawn P. Gorman; Robin W. Edwards; Trenton J. Roche

(57) ABSTRACT

An adjustable beam directing optical system for a focused laser differential interferometer (FLDI) instrument according to various aspects of the present technology may include an optical half waveplate to achieve an incident linear polarization orientation with equal components of laser intensity aligned to the vertical and horizontal axis of the optical system, and an optical prism for splitting these components of an incident laser beam into two orthogonally-polarized beams equally about an optical axis of the FLDI instrument. A series of beam realignment devices positioned downstream of the optical prism are configured to selectively direct each beam to a predetermined location.

16 Claims, 7 Drawing Sheets

(51) Int. Cl.
*G02B 27/28* (2006.01)
*G01B 9/02001* (2022.01)
*G02B 7/00* (2021.01)
*G02B 7/18* (2021.01)
*G02B 5/30* (2006.01)

(52) U.S. Cl.
CPC ........... *G02B 7/003* (2013.01); *G02B 7/1805* (2013.01); *G02B 27/285* (2013.01)

(58) Field of Classification Search
CPC .. G02B 1/1805; G02B 5/3083; G02B 27/285; G20B 27/283
USPC ....... 356/453, 455, 491; 359/485.06, 489.07, 359/489.08, 489.09, 489.15
See application file for complete search history.

(56) References Cited

U.S. PATENT DOCUMENTS

| | | | |
|---|---|---|---|
| 5,557,475 A * | 9/1996 | Nightingale | H01S 3/09415 359/333 |
| 2013/0010283 A1* | 1/2013 | Villiger | G01J 3/453 250/550 |
| 2021/0191062 A1* | 6/2021 | Brooker | G02B 21/16 |

OTHER PUBLICATIONS

Ceruzzi et al., "Simultaneous Velocity and Density Gradient Measurements using Two-Point Focused Laser Differential Inferometry," AIAA SciTech Forum, 2019, pp. 1-16, San Diego, California.

Ceruzzi et al., "Application of Focused Laser Differential Interferometry (FLDI) in a Supersonic Boundary Layer," AIAA ScieTech Forum, 2020, pp. 1-11, Orlando,Florida.

Smeets, "Laser Interferometer for High Sensitivity Measurements on Transient Phase Objects," IEEE Transactions on Aerospace and Electronic Systems, 1972, pp. 186-190, vol. 8, No. 2, France.

Jewell et al., "Disturbance Speed Measurements in a Circular Jet via Double Focused Laser Diferential Interferometry," AIAA SciTech Forum, 2019, pp. 1-9, San Diego, California.

Hameed et al., "Spectral Analysis of a Hypersonic Boundary Layer on a Right, Circular Cone," AIAA SciTech Forum, 2020, pp. 1-14, Orlando, Florida.

Jewell et al., "Disturbance and Phase Speed Measurements for Shock Tubes and Hypersonic Boundary-Layer Instability," AIAA aviation Forum, 2016, pp. 1-9, Washington, DC.

Bathel et al., Thorlabs, BD27 Calcite Beam Displacer, 2.7 mm Beam Separation, 01" Housing, retrieved from https://www.thorlabs.com/thorproduct.cfm?partnumber=BD27, Dec. 28, 2022.

Weisberger et al., "Two-Point Focused Laser Differential Interferometry Second-Mode Measurements at Mach 6," AIAA Aviation Forum, 2019, pp. 1-33, Dallas, Texas.

* cited by examiner

METHODS AND APPARATUS FOR AN ADJUSTABLE BEAM DIRECTING OPTICAL SYSTEM

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE TECHNOLOGY

Efforts to enhance measurement capability of a single point focused laser differential interferometer (FLDI) by developing a two-point version of the instrument have been increasing. The two-point version of this instrument may allow for measurements of density fluctuations at two closely spaced points, typically within ranges of 0.5 mm to about 5 mm. By performing a cross-correlation between the time-varying signals obtained at each point, a velocity measurement may be obtained. Not only is a velocity measurement useful to describe the flow field being studied with the FLDI instrument, but it also allows for the estimation of a frequency response of the instrument as a function of temporal frequency (with units of Hz or 1/s). Typically, FLDI data are obtained as a time series, but the response transfer functions for the instrument that describe its response are given as a function of spatial frequency (with units of 1/mm). If a velocity measurement can be obtained with the instrument (where velocity has units of mm/s), then it may be possible to apply the spatial frequency transfer functions to the temporal frequency FLDI data by multiplying by the measured velocity value ([1/mm]×[mm/s]=[1/s]).

Prior attempts have used various types of prisms to split a laser beam and create two beams that propagate through the FLDI instrument. These attempts have met with limited success due to, as one example, measurement errors created in the manner which the laser beam is split. For example, in some instances the two split beams travel at small angles relative to one another through the measurement system creating bias errors in any velocity measurement. The bias error comes about as the time lag obtained from cross-correlation is assumed to occur over a fixed distance, which only occurs if the beams remain parallel. Other factors such as cost, adjustability, and ease of use have resulted in two-point measurement systems that are not optimal.

BRIEF SUMMARY OF THE TECHNOLOGY

An adjustable beam directing optical system for a focused laser differential interferometer (FLDI) instrument according to various aspects of the present technology may include an optical half waveplate to achieve an incident linear polarization orientation with equal components of laser intensity aligned to the vertical and horizontal axis of the optical system, and an optical prism for splitting these components of an incident laser beam into two orthogonally-polarized beams equally about an optical axis of the FLDI instrument. A series of beam realignment devices positioned downstream of the optical prism may be configured to selectively direct each beam to a predetermined location.

One embodiment disclosed herein is an optical system that can be incorporated into a conventional one-point FLDI instrument to provide two-point measurement capability.

Another embodiment is an optical system that can be incorporated into a conventional one-point FLDI instrument to provide two-point measurement capability while maintaining equal distance about an optical axis for each split laser beam.

Another embodiment provides users with the ability to quickly adjust a distance between two beam realignment devices to provide a capability of adjusting the crossing distance of the two split beams to coincide with a desired target location.

Another embodiment is the ability to replace a set of optical windows to change a desired crossing angle for the two split beams as they are redirected towards the optical axis.

Yet another embodiment is the ability to replace a set of optical windows to redirect the two split beams in a manner that replicates various types of optical prisms.

These and other features, advantages, and objects of the present invention will be further understood and appreciated by those skilled in the art by reference to the following specification, claims, and appended drawings.

DETAILED DESCRIPTION OF EXEMPLARY EMBODIMENTS

Figure 1:
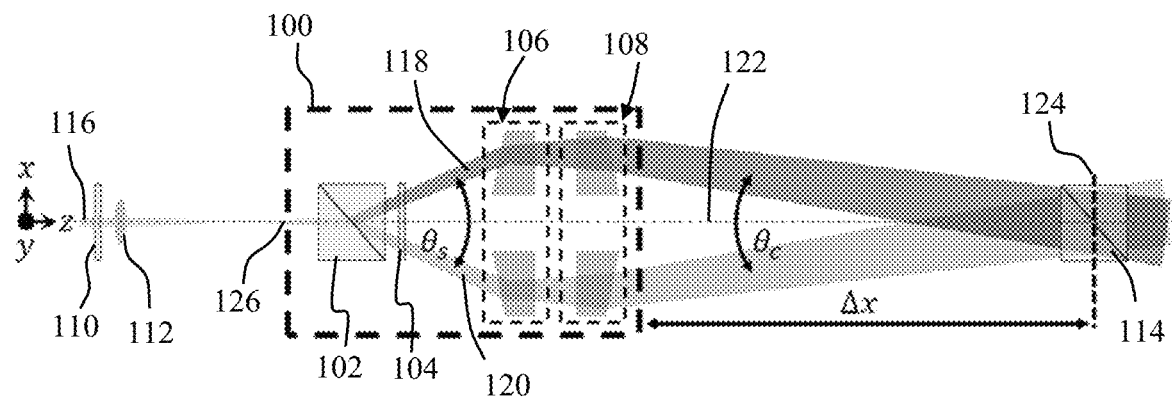
FIG. 1 representatively illustrates a block diagram of an optical system in accordance with an exemplary embodiment of the present technology.

For purposes of description herein, the terms "upper," "lower," "right," "left," "rear," "front," "vertical," "horizontal," and derivatives thereof shall relate to the technology as oriented in FIG. 1. However, it is to be understood that the technology may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present technology may be described in terms of functional block components and various processing steps. Such functional blocks may be realized by any number of components configured to perform the specified functions and achieve the various results. For example, the present technology may employ various optical devices, materials, and geometries, which may carry out a variety of operations. In addition, the technology described is merely one exemplary application for the disclosed device. Further, the present technology may employ any number of conventional techniques or methods of redirecting, focusing, expanding, polarizing, or manipulating a laser beam or other like beam of light.

Methods and apparatus for an adjustable beam directing optical system according to various aspects of the present technology may operate in conjunction with any type of laser-based measurement system such as a focused laser differential interferometer (FLDI) instrument. Various representative implementations of the present technology may be applied to any type of laser device or optical measurement system. Referring now to FIG. 1, in one representative embodiment, a beam directing optical system 100 may comprise a beam splitter 102 positioned to receive an incident laser beam 116 and split it into a plurality of beams, for example, two beams, a polarizing element 104, which may be positioned immediately downstream from the beam splitter 102. Optical system 100 is shown depicted with a pair of beam realignment devices 106, 108 configured to redirect the two beams towards a target 114. In another embodiment, a different quantity of beam realignment devices may be utilized.

The beam splitter 102 is configured to split an incoming laser beam into two or more beams that can be used to increase the measuring capability of a FLDI or other optical measurement systems. In this regard, although reference is made to an FLDL, those skilled in the art will appreciate that other measurement systems are envisioned within the scope of certain embodiments. The beam splitter 102 may comprise any system or transparent optical device for splitting a beam into two or more beams such as a Rochon prism, a Wollaston prism, a calcite beam displacer, amongst other devices.

In one embodiment, the beam splitter 102 may comprise a Wollaston prism suitably configured to receive a laser beam 116 on a first side and split the beam into two separate orthogonally polarized beams 118, 120 that exit from an opposing side of the prism. The two orthogonally polarized beams 118, 120 may be split by an equal, but opposite angle about an optical axis 122 of the FLDI (shown along the z-axis of FIG. 1) that may also coincide with the axis of the incoming incident laser beam 116. For example, the Wollaston prism (and/or other components of splitter 102) may be configured to split the incoming initial laser beam 116 into two beams by a splitting angle ($\theta$s). A first beam 118 may be angled from the optical axis 122 by an angle one-half that of $\theta$s. Similarly, a second beam 120 may be angled from the optical axis 122 by an angle that is also one-half that of $\theta$s but opposite the optical axis 122 as the first beam 118 thereby forming two beams that are symmetric about the optical axis 122 of the FLDI.

The splitting angle $\theta$s may comprise any suitable angle and may be selected according to any criteria such as the type of optical instrument being used, the environment, available space, or desired sensitivity. For example, in certain embodiments, the splitting angle ($\theta$s) may comprise an angle of between about five degrees and about forty-five degrees.

Figure 2:
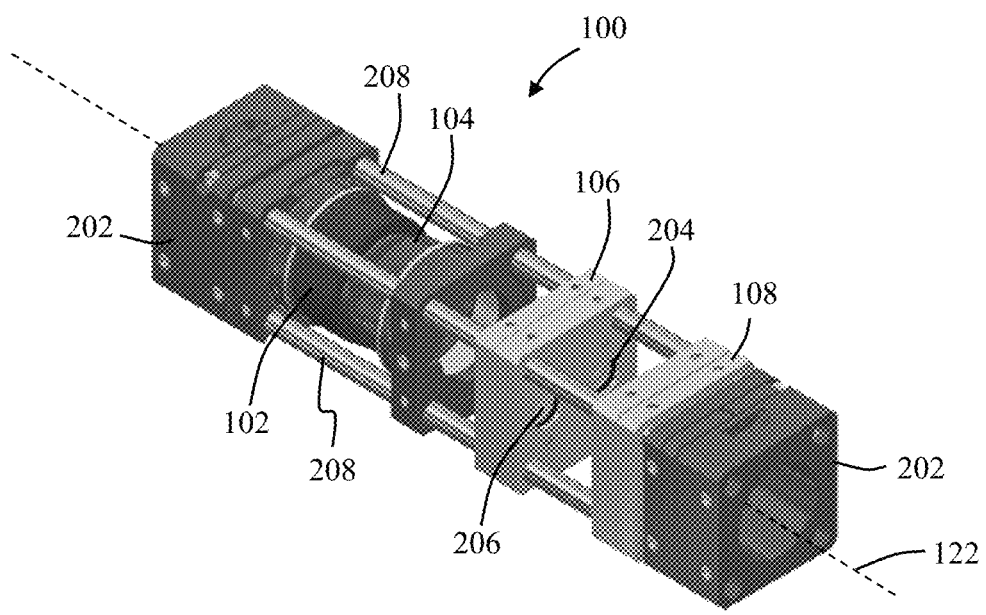
FIG. 2 representatively illustrates a perspective view of an optical system in accordance with an exemplary embodiment of the present technology.
Figure 3:
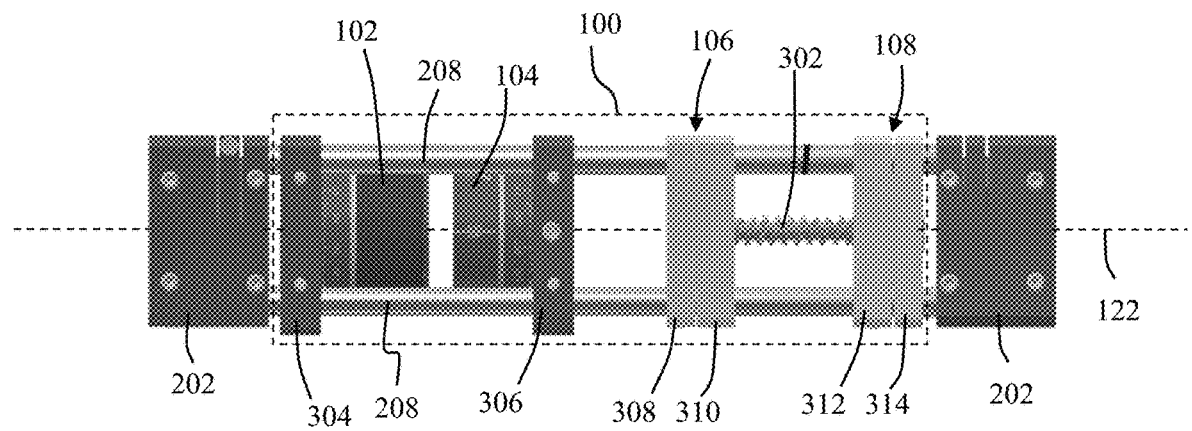
FIG. 3 representatively illustrates a side view of an optical system in accordance with an exemplary embodiment of the present technology.
Figure 4:
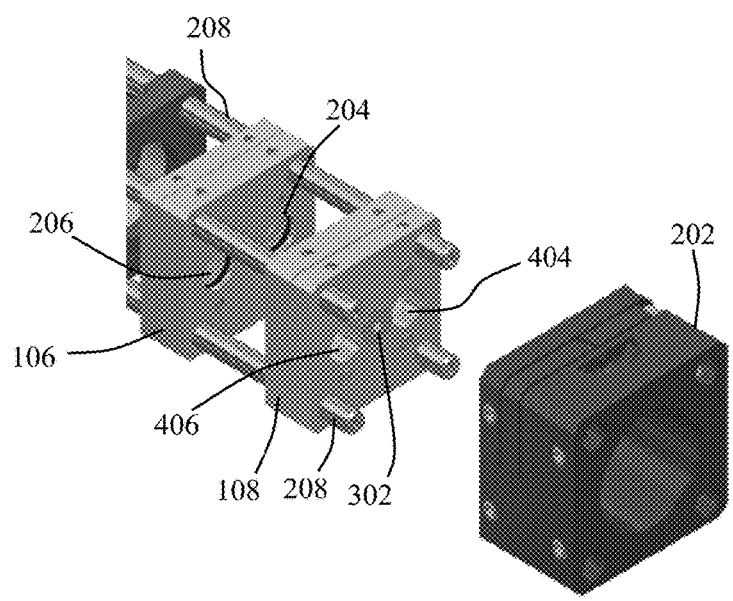
FIG. 4 representatively illustrates a perspective view of an adjustment mechanism of a beam realignment device in accordance with an exemplary embodiment of the present technology.
Figure 5:
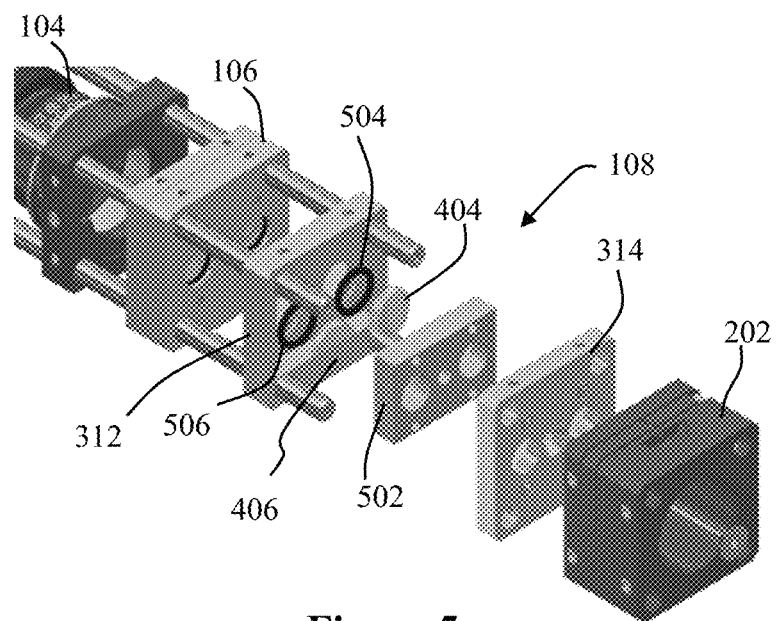
FIG. 5 representatively illustrates an exploded view of a beam realignment device in accordance with an exemplary embodiment of the present technology.
Figure 6:
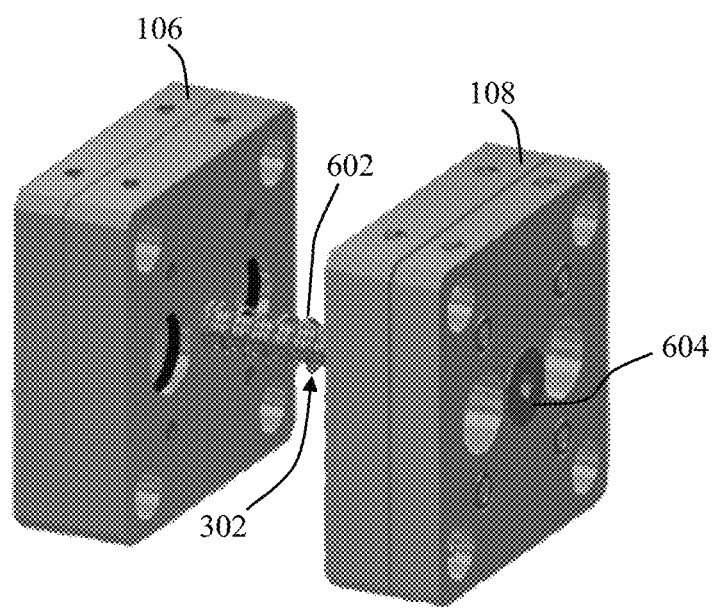
FIG. 6 representatively illustrates a perspective view of the adjustment mechanism between two beam realignment devices in accordance with an exemplary embodiment of the present technology.

With reference now to FIGS. 1-3, the beam splitter 102 may be housed within or otherwise connected to a rotation mount, such as rotation mount 304 (shown in FIG. 3). The rotation mount 304 may allow the beam splitter 102 to be rotated about the optical axis 122 to help set an orientation of the beam splitter 102 relative to the first beam realignment device 106. For example, after the incoming diverging laser beam 126 has been split into two beams 118, 120, the beam splitter 102 may be rotated within the rotation mount 304 to allow for proper alignment of the two beams 118, 120 with a pair of windows 204, 206 disposed in the first beam realignment device 106. Once aligned, the rotation mount 304 may be configured to lock the beam splitter 102 in position to keep the beams 118, 120 and windows 204, 206 aligned during use.

Figure 10:
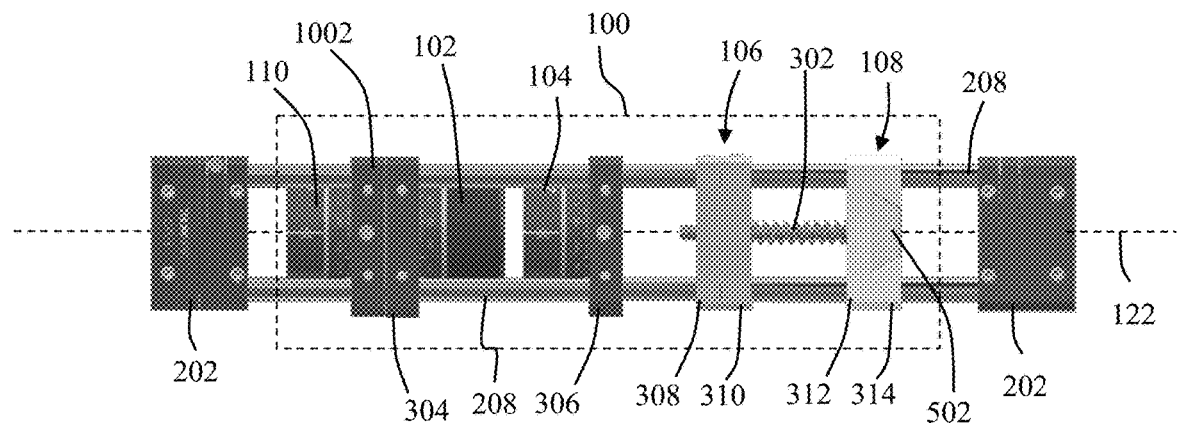
FIG. 10 representatively illustrates a side view of the optical system including the replaceable window housing shown in FIG. 9 in accordance with an exemplary embodiment of the present technology.

The beam splitter 102 may also be configured to split the incoming laser beam 116 without disrupting a state or condition of the beam itself. For example, the incoming laser beam 116 may be passed through an initial polarizing element 110 such as a ½ wave plate or other similar device or filter. The polarized beam may then pass through a diverging lens 112 that is used to form an expanding laser beam 126. The beam splitter 102 may allow the expanding laser beam 126 to continue expanding as it passes through the beam splitter 102 while maintaining the symmetry of the two separate orthogonally polarized beams 118, 120 about the optical axis 122 of the FLDI. In an alternative embodiment, and referring now to FIGS. 10 and 11, the initial polarizing element 110 may be positioned between the diverging lens 112 and the beam splitter 102.

Referring again to FIG. 1, a second polarizing element 104 located immediately downstream of the beam splitter 102 may be configured to adjust the polarization of the two beams 118, 120 after they exit the beam splitter 102 and before the enters a beam realignment device, such as e.g., first beam realignment device 106. For example, in one embodiment, the polarizing element 104 may comprise a ½ wave plate configured to reorient the polarization state of the two beams such that they are at ±45 degrees relative to a splitting plane (x-z plane as shown in FIG. 1) of the beam splitter 102.

Referring now to FIGS. 2 and 3, the polarizing element 104 may be housed within or otherwise connected to a second rotation mount 306. The second rotation mount 306 may allow the polarizing element 104 to be rotated about the optical axis 122 to help set an alignment of the polarizing element 104 relative to the two split beams 118, 120 and the first beam realignment device 106. Once aligned, the second rotation mount 306 may be configured to lock the polarizing element 104 in position during use. Similarly, the initial polarizing element 110 may be housed within or otherwise connected to a third rotation mount 1002 (e.g., as shown in the embodiment depicted in FIG. 10).

Referring now to FIGS. 1-4, the first beam realignment device 106 may be positioned to receive the two beams 118, 120 from the polarizing element 104 and redirect the beams parallel to the optical axis 122. The first beam realignment device 106 may comprise any system or device capable of redirecting the two beams 118, 120. In one embodiment, the first beam realignment device 106 may comprise a housing having a pair of openings configured to hold a pair of optical windows 204, 206 disposed within the housing and positioned such that each window 204, 206 is able to receive one of the two beams 118, 120. The housing may be formed of a forward portion 308 and a back portion 310 coupled together to at least partially enclose the pair of optical windows 204, 206.

The pair of optical windows 204, 206 may each be configured to receive a beam of light through a first side at a first angle and then redirect the beam such that it exits an opposing second side parallel to the optical axis 122. For example, a first window 204 may be configured to refract the first beam 118 towards the optical axis 122 by an angle that is equal to one-half θs. Similarly, the second window 206 may be configured to refract the second beam 120 towards the optical axis 122 by an angle that is also equal to one-half θs.

Referring now to FIGS. 1-5, the second beam realignment device 108 is positioned downstream from the first beam realignment device 106 and is configured to redirect the two beams 118, 120 towards the optical axis 122. The second beam realignment device 108 may comprise any system or device capable of redirecting the two beams 118, 120. In one embodiment, the second beam realignment device 108 may comprise a housing and a second pair of optical windows 404, 406 disposed within the housing and aligned with the first pair of optical windows 204, 206 such that each optical window 404, 406 is able to receive one of the two beams 118, 120 from the first beam realignment device 106.

The second pair of optical windows 404, 406 may be configured to receive a beam of light through a first side at a first angle and then redirect the beam towards the optical axis 122 when it exits an opposing second side. The combined redirection angle of the second pair of optical windows 404, 406 may comprise a crossing angle ($\theta c$). The θc may determine a crossing distance ($\Delta x$) where the two beams 118, 120 will each cross the optical axis 122 at the same crossing location 124. For example, the first optical window 404 may be configured to refract the first beam 118 towards the optical axis 122 by an angle that is equal to one-half θc. Similarly, the second optical window 406 may also be configured to refract the second beam 120 towards the optical axis 122 by one-half θc.

The crossing location 124 may be adjusted or altered by changing the crossing angle of the two beams 118, 120. For example, by increasing the crossing angle the crossing distance may be reduced bringing the crossing location 124 closer to the second beam realignment device 108. Conversely, by decreasing the crossing angle the crossing distance may be increased moving the crossing location 124 further away from the second beam realignment device 108.

Figure 7:
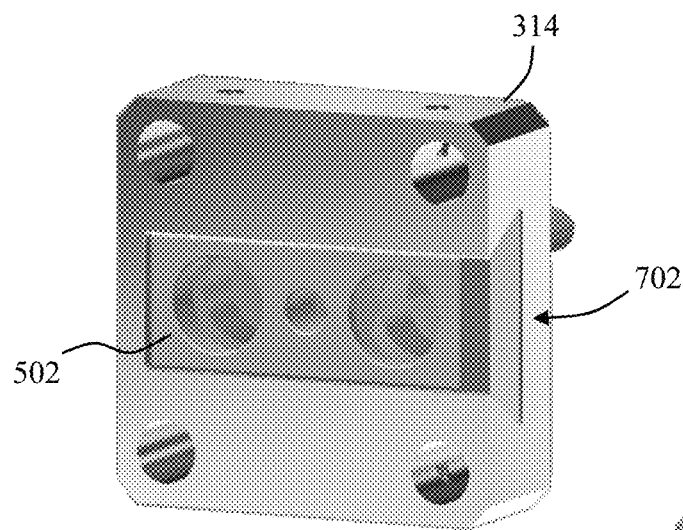
FIG. 7 representatively illustrates a rear perspective view of a replaceable window housing for a beam realignment device in accordance with an exemplary embodiment of the present technology.
Figure 8:
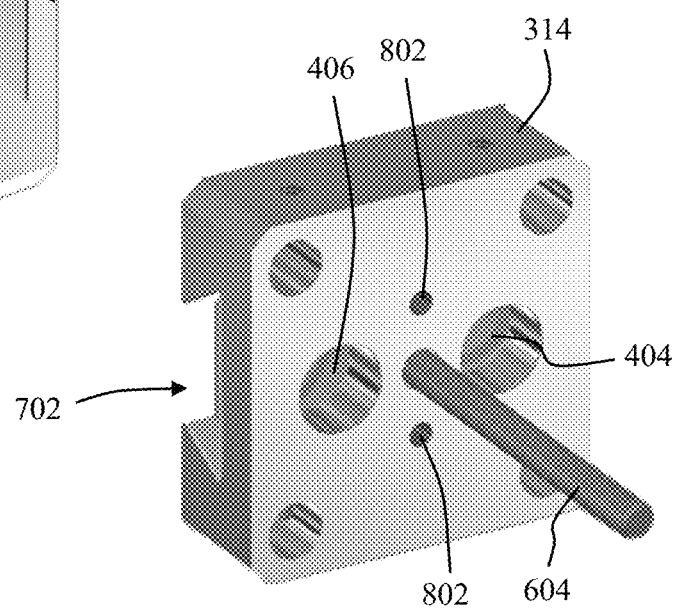
FIG. 8 representatively illustrates a front perspective view of a replaceable window housing for a beam realignment device in accordance with an exemplary embodiment of the present technology.
Figure 9:
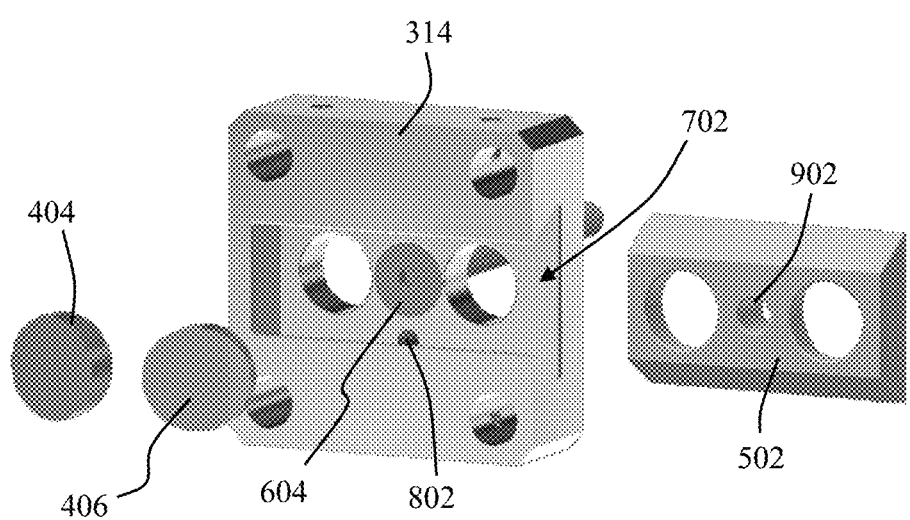
FIG. 9 representatively illustrates an exploded view of a replaceable window housing for a beam realignment device in accordance with an exemplary embodiment of the present technology.

The housing of the second beam realignment device 108 may be configured to allow the second pair of optical windows 404, 406 to be interchangeable with one or more other optical windows configured to refract the first and second beams 118, 120 by any desired angle. For example, referring now to FIG. 5, the second pair of optical windows 404, 406 may be configured to be fixed within a removable optical mount 502 positioned between a forward portion 312 and a back portion 314 coupled together to at least partially enclose the optical mount 502. In one embodiment, and referring now to FIGS. 7-9, the back portion 314 may be configured to allow the optical mount 502 to be slid into and out of a slot 702 the housing. For example, a rear facing surface of the back portion 314 may comprise a slot 702 configured to allow the optical mount 502 to be removed. The back portion 314 may further comprise a set of thru holes 802 configured to receive a set of screws configured to hold the optical mount 502 in place.

Figure 12:
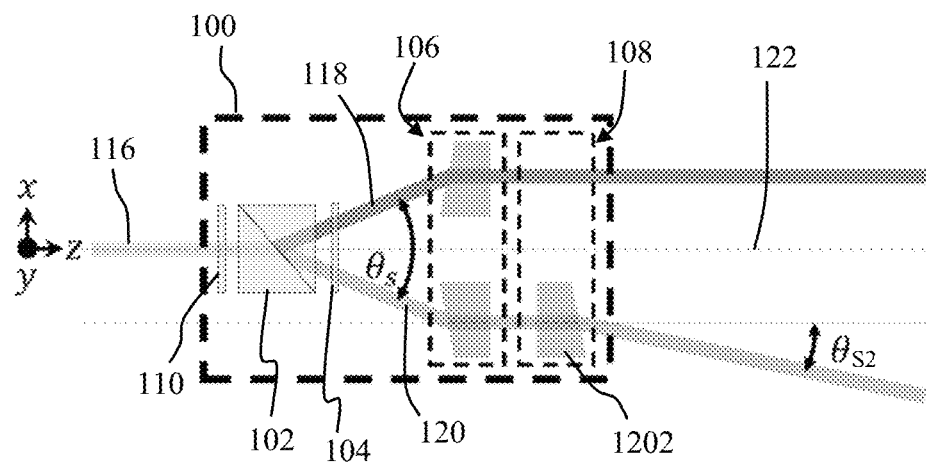
FIG. 12 representatively illustrates a block diagram of an alternative embodiment of the optical system for two noncrossing beams in accordance with an exemplary embodiment of the present technology.

The optical mount 502 may then be selectively removed by the user and replaced with a second optical mount (not shown) housing another pair of optical windows 404, 406 to adjust the crossing angle of the second pair of optical windows 404, 406. In alternative embodiments, the optical mount 502 may be configured with one or more other optical windows selected to redirect the two beams 118, 120 at any desired angle. For example, and with particular reference to FIG. 12, the second beam realignment device 108 may comprise only a single optical window 1202 that is configured to redirect the second beam 120 away from the optical axis 122 by a second splitting angle ($\theta_{s2}$). The second beam realignment device 108 may allow the first beam 118 to progress unrefracted such that it remains parallel to the optical axis 122. In this embodiment, the first and second beams 118, 120 do not cross and may be directed towards two different points.

Figure 13:
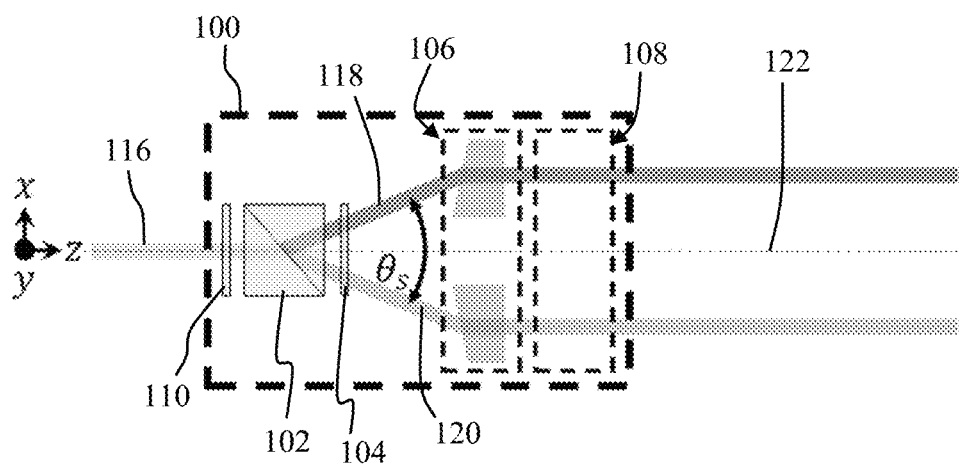
FIG. 13 representatively illustrates a block diagram of an alternative embodiment of the optical system for two parallel beams in accordance with an exemplary embodiment of the present technology.

In a third embodiment, and with reference now to FIG. 13, the second beam realignment device 108 may not comprise any optical windows. In this configuration, the second beam realignment device 108 may allow the first and second beams 118, 120 to progress unrefracted such that they both remain parallel to the optical axis 122. In this embodiment, the first and second beams 118, 120 do not cross and may be directed towards two different points.

Figure 14:
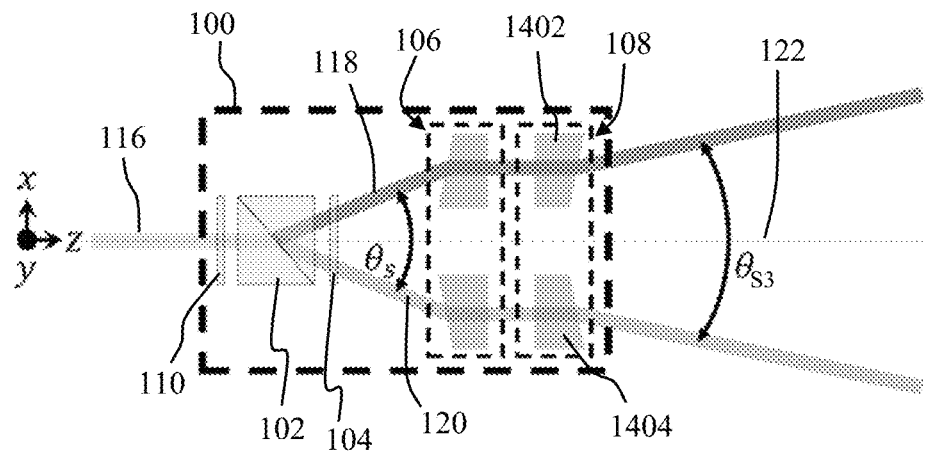
FIG. 14 representatively illustrates a block diagram of an alternative embodiment of the optical system for two diverging beams in accordance with an exemplary embodiment of the present technology.

Referring now to FIG. 14, in a fourth embodiment, the second beam realignment device 108 may be configured to further split the first and second beams 116 by a third splitting angle ($\theta_{s3}$). The first beam 118 may be angled from the optical axis 122 by an angle one-half that of $\theta_{s3}$ and the second beam 120 may also be angled from the optical axis 122 by an angle that is also one-half that of $\theta_{s3}$ but opposite the optical axis 122 as the first beam 118 thereby maintaining the symmetric distance of the first and second beams 118, 120 about the optical axis 122 of the FLDI. For example, the second beam realignment device 108 may comprise a first diverging optical window 1402 that is configured to redirect the first beam 118 away from the optical axis 122 by one-half $\theta_{s3}$ and a second diverging optical window 1404 that is configured to redirect the second beam 120 away from the optical axis 122 by one-half $\theta_{s3}$. In this embodiment, the first and second beams 118, 120 do not cross and may be directed towards two different points.

Figure 15:
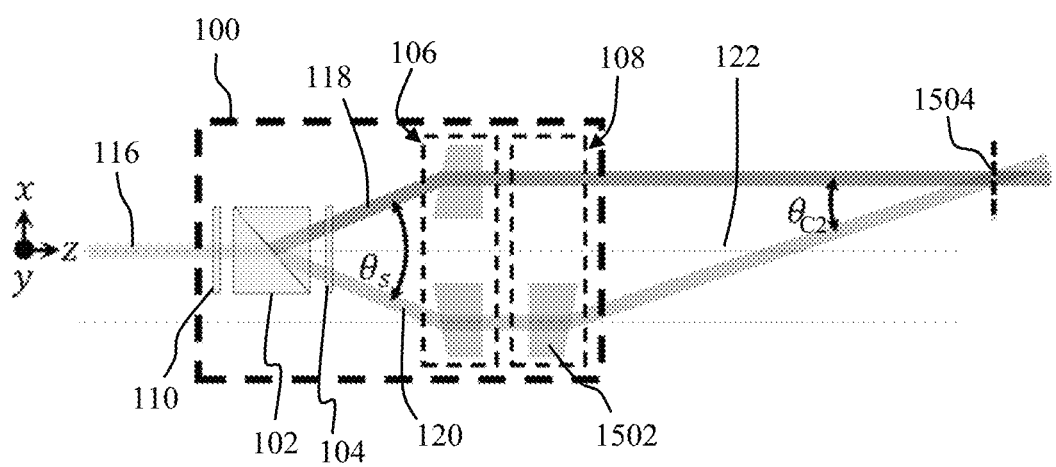
FIG. 15 representatively illustrates a block diagram of an alternative embodiment of the optical system for two off-axis crossing beams in accordance with an exemplary embodiment of the present technology.

In yet another embodiment, the second beam realignment device 108 may be configured to cross the first and second beams 118, 120 at an off-axis location. With reference now to FIG. 15, the second beam realignment device 108 may comprise only a single optical window 1502 that is configured to redirect the second beam 120 towards the optical axis 122 by a second crossing angle $(\theta_{c2})$. The second beam realignment device 108 may allow the first beam 118 to progress unrefracted such that it remains parallel to the optical axis 122. In this embodiment, the first and second beams 118, 120 will cross at an off-axis target 1504.

The second beam realignment device 108 may comprise any suitable combination of zero, one, or two optical windows to perform a desired function. The combination may be selected according to a type of measurement instrument that the beam directing optical system 100 is being used with or according to a desired type of measurement. One of skill in the art will recognize that the specific combinations described above are not exhaustive and represent a small sample of exemplary embodiments.

The optical mount 502 may comprise a thru hole 902 and an opening for each optical window 404, 406. The thru hole 902 may allow an adjustment screw 604 to be accessed during use to adjust the distance between the first and second beam realignment devices 106, 108 as detailed below.

Referring again to FIG. 5, one or more components, such as the depicted pair of o-rings 504, 506, may be used to provide some protection to the optical windows 404, 406. For example, an o-ring may be fitted around an outer peripheral surface or edge of each optical window 404, 406 to help reduce a likelihood of the optical windows 404, 406 being chipped or cracked or to prevent foreign debris from entering the optical mount 502. Any other suitable device may be used to protect the optical windows 404, 406 such as sealants or insulating materials.

One or more portions of a housing of the first beam realignment device 106 may be similarly constructed with an optical mount for the pair of optical windows 204, 206 that is configured to be positioned within the forward portion 308 and the back portion 310. A housing may also be configured to allow for the replacement of the optical windows 204, 206.

Referring now to FIGS. 1, 3, 4, and 6, the second beam realignment device 108 may be configured to provide the ability to finely adjust the crossing location 124 of the two beams 118, 120 when the beam directing optical system 100 is in use. For example, a desired beam crossing location 124 may coincide with a target 114 such as another prism. However, once the beam directing optical system 100 is positioned within the FLDI instrument the actual crossing location 124 may not be located exactly at the target 114. By moving the second beam realignment device 108 slightly forward or aft (longitudinally along the optical axis 122) in the FLDI instrument, a user may be able to adjust the crossing location 124 to the desired location.

A beam realignment device, such as the depicted second beam realignment device 108, may be configured in any suitable manner to allow it to be moved along the optical axis 122. In one embodiment, an adjustment mechanism, such as alignment mechanism 302 may connect the first and second beam realignment devices 106, 108 together and allow the first and second beam realignment devices 106, 108 to be moved forward or aft relative each other. In one embodiment, this may be accomplished by allowing the second beam realignment device 108 to be moved forward or aft relative to the first beam realignment device 106. In one embodiment, the adjustment mechanism 302 may comprise an adjustment screw 604 and a spring 602 positioned around the spring to engage a rear facing surface of the first beam realignment device 106 and a forward facing surface of the second beam realignment device 108.

The adjustment screw 604 may be rotated to adjust a separation distance between the first and second beam realignment devices 106, 108. For example, in one implementation, by bringing the first and second beam realignment devices 106, 108 closer together, the crossing location 124 may be moved in the direction of the first and second beam realignment devices 106, 108. Conversely, by increasing the separation distance between the first and second beam realignment devices 106, 108, the crossing location 124 may be moved towards the target 114.

In the depicted embodiment, the spring 602 engages both of the beam realignment devices 106, 108 and is biased to act against an exterior surface of each component. The spring force acting against the first and second beam realignment devices 106, 108 allows for more precise control of the separation distance between the first and second beam realignment devices 106, 108 when the adjustment screw 604 is turned.

Beam directing optical systems disclosed herein may further comprise a mounting system configured to be connected to a plurality of components and aid in maintaining an alignment of components during use. A mounting system may also be configured to allow various embodiments of beam directing optical systems to be rotated longitudinally about the optical axis. For example, referring now to the embodiments depicted in FIGS. 2-4, a set of alignment rods 208 may be connected to the beam splitter 102, the polarization element 104, and the first and second beam realignment devices 106, 108 to maintain the position and alignment of multiple components. The alignment rods 208 may comprise any suitable device or structure for providing a rigid connection that allows for alignment. The alignment rods 208 may also comprise any shape or size and may be selected according to a given use or application. For example, the alignment rods 208 may comprise tubular rods, rectangular bars, slats, or walls configured to provide a rigid mounting structure.

In one embodiment, the alignment rods 208 may comprise a plurality of metallic rods having a length of between about two inches (50 mm) and about eight inches (203 mm) arranged around peripheral edges of the individual components. For example, the beam directing optical system 100 may comprise four alignment rods 208 configured to extend through a set of openings positioned at outer corners of the housings that hold each component. The housings for each component may comprise a generally square shape such that the outer corners of each housing are spaced equidistant from the optical axis 122. Those skilled in the art will appreciate that other shapes may be desired without departing from the scope of this disclosure.

An end of each alignment rod 208 may be attached to a mount 202 configured to secure the beam directing optical system 100 into the instrument during use. The mount 202 may comprise any device capable of engaging the alignment rods 208 and fixing them in place. In one embodiment, the mount 202 may be configured to rotate the entire beam directing optical system 100 about the optical axis 122 in unison, thereby allowing the user to change the orientation of the beams azimuthally relative to the optical axis.

Figure 11:
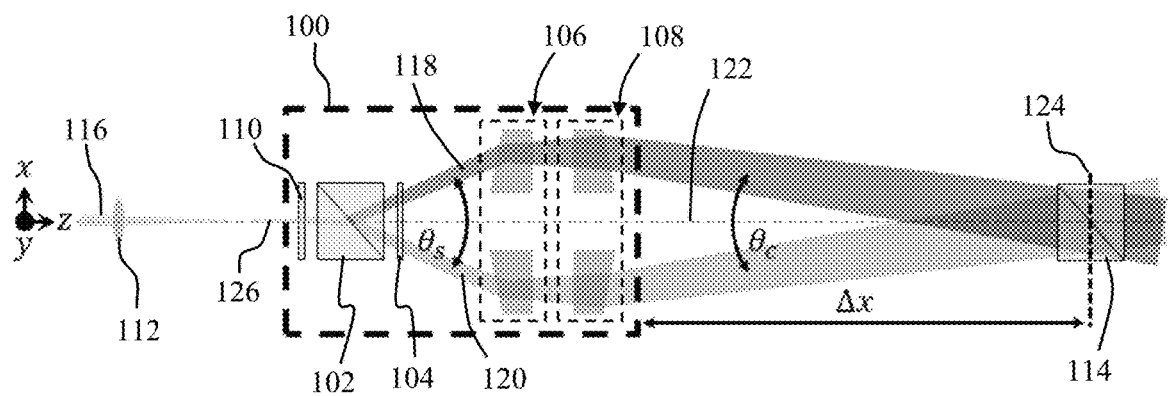
FIG. 11 representatively illustrates a block diagram of an alternative embodiment of the optical system in accordance with an exemplary embodiment of the present technology.

In operation of an embodiment (such as represented by FIGS. 1 and 11), a beam splitter 102 may be positioned to receive an incoming laser beam 116/126 and split the beam into two orthogonally-polarized beams 118, 120 equally about an optical axis 122 of a FLDI instrument. A polarizing element 104 may be located downstream of the beam splitter 102 and be configured to reorient a polarization state of the two beams 118, 120 such that they are at ±45 degrees relative to a splitting plane of the beam splitter 102.

A first beam realignment device 106 may be positioned to receive the two beams 118, 120 through a pair of optical windows 204, 206 that are configured to redirect each beam 118, 120 so that it exits the first beam realignment device 106 parallel to the optical axis 122 such that both beams 118, 120 are still spaced symmetrically about the optical axis 122. The amount each beam 118, 120 is redirected by the respective optical window 204, 206 may be determined according to a splitting angle created by the beam splitter 102 when it splits the incoming laser beam 116/126.

A second beam realignment device 108 is positioned to receive the two beams 118, 120 exiting the first beam realignment device 106 and redirect them towards the optical axis 122 such that the two beams 118, 120 cross each other at the optical axis 122 at a predetermined crossing location 124. The crossing location 124 is determined according to a crossing angle created when the two beams 118, 120 exit the second beam realignment device 108.

The crossing location 124 of the two beams 118, 120 may be adjusted slightly to allow a user to ensure that the beams 118, 120 properly hit a target 114 positioned at the intended crossing location 124. For example, a longitudinal position of the second beam realignment device 108 along a length of the beam directing optical system 100 may be adjusted to provide the ability to change the exact crossing location 124.

These and other embodiments for methods of beam directing may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

What is claimed is:

1. An optical system for providing two-point measurement capability to a focused laser differential interferometer (FLDI) instrument, comprising:
    a beam splitter configured to split an incident laser beam into two orthogonally-polarized beams spaced equally about an optical axis of the FLDI instrument by a splitting angle;
    a polarizing element positioned downstream of the beam splitter to receive the two orthogonally-polarized beams and reorient a polarization state of each beam;
    a first beam realignment device positioned downstream of the polarizing element and comprising a first pair of optical windows, wherein:
        a first optical window redirects a first orthogonally-polarized beam parallel to the optical axis of the FLDI instrument by an angle equal to one-half the splitting angle; and
        a second optical window redirects a second orthogonally-polarized beam parallel to the optical axis of the FLDI instrument by an angle equal to one-half the splitting angle; and
    a second beam realignment device positioned a specified distance downstream of the first beam realignment device to receive the two parallel orthogonally-polarized beams, wherein the first and second beam realignment devices are coupled together by an adjustment mechanism, wherein the adjustment mechanism allows the second beam realignment device to move longitudinally along the optical axis relative to the first beam realignment device to adjust a distance between the first and second beam realignment devices to adjust a beam crossing distance of the first and second orthogonally-polarized beams from the second beam realignment device.

2. An optical system according to claim 1, wherein the second beam realignment device comprises at least one optical window configured to redirect one of the two parallel orthogonally-polarized beams.

3. An optical system according to claim 1, wherein the second beam realignment device comprises an optical mount configured to hold:
    a third optical window configured to redirect the first orthogonally-polarized beam in a first direction; and
    a fourth optical window configured to redirect the second orthogonally-polarized beam in a second direction.

4. An optical system according to claim 3, wherein:
the third optical window redirects the first orthogonally-polarized beam towards the optical axis of the FLDI instrument; and
the fourth optical window redirects the second orthogonally-polarized beam towards the optical axis of the FLDI instrument.

5. An optical system according to claim 4, wherein the third and fourth optical windows redirect the first and second orthogonally-polarized beams towards the optical axis of the FLDI instrument by the same angle.

6. An optical system according to claim 1, further comprising a second polarizing element positioned immediately upstream of the beam splitter.

7. An optical system according to claim 1, wherein the beam splitter is connected to a rotation mount configured to allow the beam splitter to be rotated relative to the incident laser beam.

8. An optical system according to claim 7, wherein the polarizing element is connected to a second rotation mount configured to allow the polarizing element to be rotated relative to the two orthogonally-polarized beams coming from the beam splitter.

9. An optical system according to claim 1, wherein:
the beam splitter comprises a Wollaston prism; and
the polarizing element comprises a half-wave plate.

10. An optical system for providing two-point measurement capability to a focused laser differential interferometer (FLDI) instrument, comprising:
a mounting device, comprising:
a first rotational mount;
a second rotational mount; and
a set of alignment rods coupled to and extending between the first and second rotational mounts, wherein:
the set of alignment rods are arranged around peripheral edges of the first and second rotational mounts; and
the first and second rotational mounts allow the mounting device to be rotated about an optical axis of the FLDI instrument;
a first polarizing element connected to the set of alignment rods adjacent to the first rotational mount;
a beam splitter connected to the set of alignment rods adjacent to and downstream of the first polarizing element, wherein the beam splitter is configured to split an incident laser beam passing through the first polarizing element into two orthogonally-polarized beams equally about the optical axis of the FLDI instrument;
a second polarizing element connected to the set of alignment rods proximate to the beam splitter, wherein the second polarizing element is positioned to receive the two orthogonally-polarized beams and reorient a polarization state of each beam;
a first beam realignment device connected to the set of alignment rods and positioned downstream of the second polarizing element, comprising a first pair of optical windows, wherein:
a first optical window redirects a first orthogonally-polarized beam parallel to the optical axis of the FLDI instrument; and
a second optical window redirects a second orthogonally-polarized beam parallel to the optical axis of the FLDI instrument; and
a second beam realignment device connected to the set of alignment rods and positioned a specified distance downstream of the first beam realignment device, comprising an optical mount for receiving the second orthogonally-polarized beams.

11. An optical system according to claim 10, wherein the optical mount is configured to hold:
a third optical window configured to redirect the first orthogonally-polarized beam towards the optical axis of the FLDI instrument; and
a fourth optical window configured to redirect the second orthogonally-polarized beam towards the optical axis of the FLDI instrument.

12. An optical system according to claim 10, wherein the first and second beam realignment devices are coupled together by an adjustment mechanism, wherein the adjustment mechanism allows the second beam realignment device to move longitudinally relative to the first beam realignment device to adjust a distance between the first and second beam realignment devices to adjust a beam crossing distance for the first and second orthogonally-polarized beams.

13. An optical system according to claim 12, wherein the third and fourth optical windows redirect the first and second orthogonally-polarized beams towards the optical axis of the FLDI instrument by the same angle.

14. An optical system according to claim 10, wherein:
the first polarizing element is connected to a third rotation mount configured to allow the first polarizing element to be rotated relative to the incident beam independently from the set of alignment rods;
the beam splitter is connected to a fourth rotation mount configured to allow the beam splitter to be rotated relative to the incident laser beam independently from the set of alignment rods; and
the second polarizing element is connected to a fifth rotation mount configured to allow the second polarizing element to be rotated relative to the two orthogonally-polarized beams coming from the beam splitter independently from the set of alignment rods.

15. An optical system according to claim 10, wherein:
the beam splitter comprises a Wollaston prism; and
the first and second polarizing elements each comprise a half-wave plate.

16. An optical system for providing two-point measurement capability to a focused laser differential interferometer (FLDI) instrument, comprising:
a beam splitter configured to split an incident laser beam into two orthogonally-polarized beams spaced equally about an optical axis of the FLDI instrument by a splitting angle;
a polarizing element positioned downstream of the beam splitter to receive the two orthogonally-polarized beams and reorient a polarization state of each beam;
a first beam realignment device positioned downstream of the polarizing element and comprising a first pair of optical windows, wherein:
a first optical window redirects a first orthogonally-polarized beam parallel to the optical axis of the FLDI instrument by an angle equal to one-half the splitting angle; and
a second optical window redirects a second orthogonally-polarized beam parallel to the optical axis of the FLDI instrument by an angle equal to one-half the splitting angle; and
a second beam realignment device positioned a specified distance downstream of the first beam realignment device to receive the two parallel orthogonally-polarized beams;

a set of alignment rods connecting the optical device, the polarizing element, and the first and second beam realignment devices together, wherein the set of alignment rods are configured to maintain an alignment of the beam splitter, the polarizing element, and the first and second beam realignment devices;

a first rotational mount is coupled to one end of the set of alignment rods adjacent to the beam splitter; and a second rotational mount is coupled to an opposing end of the set of alignment rods adjacent to the second beam realignment device, wherein the first and second rotational mounts allow the optical device, the polarizing element, and the first and second beam realignment devices to be rotated about the optical axis of the FLDI instrument in unison.

* * * * *